United States Patent
Rahman

(10) Patent No.: US 10,041,860 B2
(45) Date of Patent: Aug. 7, 2018

(54) METHOD FOR DETECTING A FAULTY AIR HANDLER IN A HEAT PUMP APPLIANCE

(71) Applicant: General Electric Company, Schenectady, NY (US)

(72) Inventor: Rizwana Rahman, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 566 days.

(21) Appl. No.: 14/609,882

(22) Filed: Jan. 30, 2015

(65) Prior Publication Data

US 2016/0223481 A1    Aug. 4, 2016

(51) Int. Cl.
G01N 25/00 (2006.01)
G01M 99/00 (2011.01)
G01K 13/02 (2006.01)

(52) U.S. Cl.
CPC ........... *G01M 99/002* (2013.01); *G01K 13/02* (2013.01)

(58) Field of Classification Search
None
See application file for complete search history.

(56) References Cited

U.S. PATENT DOCUMENTS

| | | | |
|---|---|---|---|
| 6,509,553 B2 * | 1/2003 | Golan | G01N 25/18 219/505 |
| 7,412,842 B2 | 8/2008 | Pham | |
| 8,042,347 B2 * | 10/2011 | Sawada | F25B 49/02 374/134 |
| 8,291,719 B2 * | 10/2012 | Cowans | F25B 40/00 62/222 |
| 2014/0290288 A1 * | 10/2014 | Burns | F25B 49/02 62/115 |
| 2014/0333322 A1 * | 11/2014 | Kabler | G01R 31/2836 324/511 |

FOREIGN PATENT DOCUMENTS

CN    103575058 A    2/2014

OTHER PUBLICATIONS

CN103575058 translation.*

* cited by examiner

*Primary Examiner* — Lisa Caputo
*Assistant Examiner* — Nasir U Ahmed
(74) *Attorney, Agent, or Firm* — Dority & Manning, P.A.

(57) ABSTRACT

A method for detecting a faulty air handler of a heat pump appliance is provided. The method includes activating a compressor of the heat pump appliance and deactivating the compressor of the heat pump appliance at a predetermined period of time after the step of activating. The method also includes determining temperatures of a fluid treated by the heat pump appliance and refrigerant in the heat pump appliance and requesting replacement of the air handler of the heat pump appliance if various conditions associated with the temperatures of fluid treated by the heat pump appliance and refrigerant in the heat pump appliance are met.

9 Claims, 5 Drawing Sheets

METHOD FOR DETECTING A FAULTY AIR HANDLER IN A HEAT PUMP APPLIANCE

FIELD OF THE INVENTION

The present subject matter relates generally to heat pump appliances, such as heat pump water heater appliances, and methods for performing diagnostics on heat pump appliances.

BACKGROUND OF THE INVENTION

Water heater appliances generally operate to heat water within the water heater appliance's tank to a set temperature. Heat pump water heaters are gaining broader acceptance as a more economic and ecologically-friendly alternative to electric and gas water heaters. Heat pump water heaters include a sealed system for heating water to the set temperature. The set temperature is generally selected such that heated water within the tank is at least hot enough for showering, washing hands, etc. Sealed systems generally heat water more efficiently than electric heating elements and gas burners.

A typical sealed system includes a compressor, a condenser, an expansion device and an evaporator operating in a closed loop configuration to manipulate a refrigerant. The condenser may be positioned adjacent to the tank of the water heater such that the refrigerant flowing through may exchange energy with water in the tank of the water heater, heating the water. By contrast, the evaporator of the sealed system may be disposed within a casing such that an airflow may be provided over the evaporator to increase an efficiency of the sealed system.

To assist with providing circulating air over the evaporator, certain sealed systems also include a fan or air handler. The fan draws or forces air over the evaporator in order to facilitate heat transfer between the air and refrigerant within the evaporator and thereby increase the efficiency of the sealed system. However, fans can fail for various reasons, and performance of an associated water heater can suffer without a properly operating fan. Further, identifying a faulty fan, particularly a fan operating at a low RPM, within heat pump water heater appliances can be difficult and/or time consuming.

Accordingly, a method for detecting a faulty air handler of a heat pump appliance would be useful. In particular, a method for detecting a faulty air handler of a heat pump appliance that does not require physical access to the fan would be useful.

BRIEF DESCRIPTION OF THE INVENTION

The present subject matter provides a method for detecting a faulty air handler of a heat pump appliance. The method includes activating a compressor of the heat pump appliance and deactivating the compressor of the heat pump appliance at a predetermined period of time after the step of activating. The method also includes determining temperatures of a fluid treated by the heat pump appliance and refrigerant in the heat pump appliance and requesting replacement of the air handler of the heat pump appliance if various conditions associated with the temperatures of fluid treated by the heat pump appliance and refrigerant in the heat pump appliance are met. Additional aspects and advantages of the invention will be set forth in part in the following description, or may be apparent from the description, or may be learned through practice of the invention.

In a first exemplary embodiment, a method for detecting a faulty air handler of a heat pump water heater appliance is provided. The method includes initiating a test of an air handler of the heat pump water heater appliance, activating a compressor of the heat pump water heater appliance during the test of the air handler of the heat pump water heater appliance and deactivating the compressor of the heat pump water heater appliance at a predetermined period of time after the step of activating. The method also includes, at the step of deactivating, determining: (1) a temperature of refrigerant at an evaporator inlet of the heat pump water heater appliance; (2) a temperature of refrigerant at an evaporator outlet of the heat pump water heater appliance; (3) a temperature of ambient air about the heat pump water heater appliance; and (4) a temperature of water within a tank of the heat pump water heater appliance. The method further includes requesting replacement of the air handler of the heat pump water heater appliance if: (1) a difference between the temperature of refrigerant at the evaporator outlet and the temperature of refrigerant at the evaporator inlet is less than about fifteen degrees Fahrenheit; (2) the temperature of refrigerant at the evaporator outlet is less than a difference between the temperature of ambient air about the heat pump water heater appliance and about five degrees Fahrenheit; (3) an electronic expansion valve of the heat pump water heater appliance is about fully open after the step of deactivating; and (4) a difference between a set temperature of the heat pump water heater appliance and the temperature of water within a tank of the heat pump water heater appliance is less than about ten degrees Fahrenheit.

In a second exemplary embodiment, a method for detecting a faulty air handler of a heat pump water heater appliance is provided. The method includes initiating a test of an air handler of the heat pump water heater appliance, activating a compressor of the heat pump water heater appliance during the test of the air handler of the heat pump water heater appliance and deactivating the compressor of the heat pump water heater appliance at a predetermined period of time after the step of activating. The method also includes, at the step of deactivating, determining: (1) a temperature of refrigerant at an evaporator inlet of the heat pump water heater appliance; (2) a temperature of refrigerant at an evaporator outlet of the heat pump water heater appliance; (3) a temperature of ambient air about the heat pump water heater appliance; and (4) a temperature of water within a tank of the heat pump water heater appliance. The method further includes requesting replacement of the air handler of the heat pump water heater appliance if: (1) a difference between the temperature of refrigerant at the evaporator outlet and the temperature of refrigerant at the evaporator inlet is less than a first temperature value; (2) the temperature of refrigerant at the evaporator outlet is less than a difference between the temperature of ambient air about the heat pump water heater appliance and a second temperature value; (3) an electronic expansion valve of the heat pump water heater appliance is about fully open after the step of deactivating; and (4) a difference between a set temperature of the heat pump water heater appliance and the temperature of water within a tank of the heat pump water heater appliance is less than a third temperature value.

In a third exemplary embodiment, a method for detecting a faulty air handler of a heat pump appliance is provided. The method includes initiating a test of an air handler of the heat pump appliance, activating a compressor of the heat pump appliance during the test of the air handler of the heat pump appliance, and deactivating the compressor of the heat pump appliance at a predetermined period of time after the step of activating. The method also includes, at the step of deactivating, determining: (1) a temperature of refrigerant at an evaporator inlet of the heat pump appliance; (2) a temperature of refrigerant at an evaporator outlet of the heat pump appliance; and (3) a temperature of fluid being treated by the heat pump appliance. The method further includes requesting replacement of the air handler of the heat pump appliance if: (1) a difference between the temperature of refrigerant at the evaporator outlet and the temperature of refrigerant at the evaporator inlet is less than a first temperature value; and (2) a difference between the temperature of refrigerant at the evaporator inlet and the temperature of fluid being treated by the heat pump appliance is less than a second temperature value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
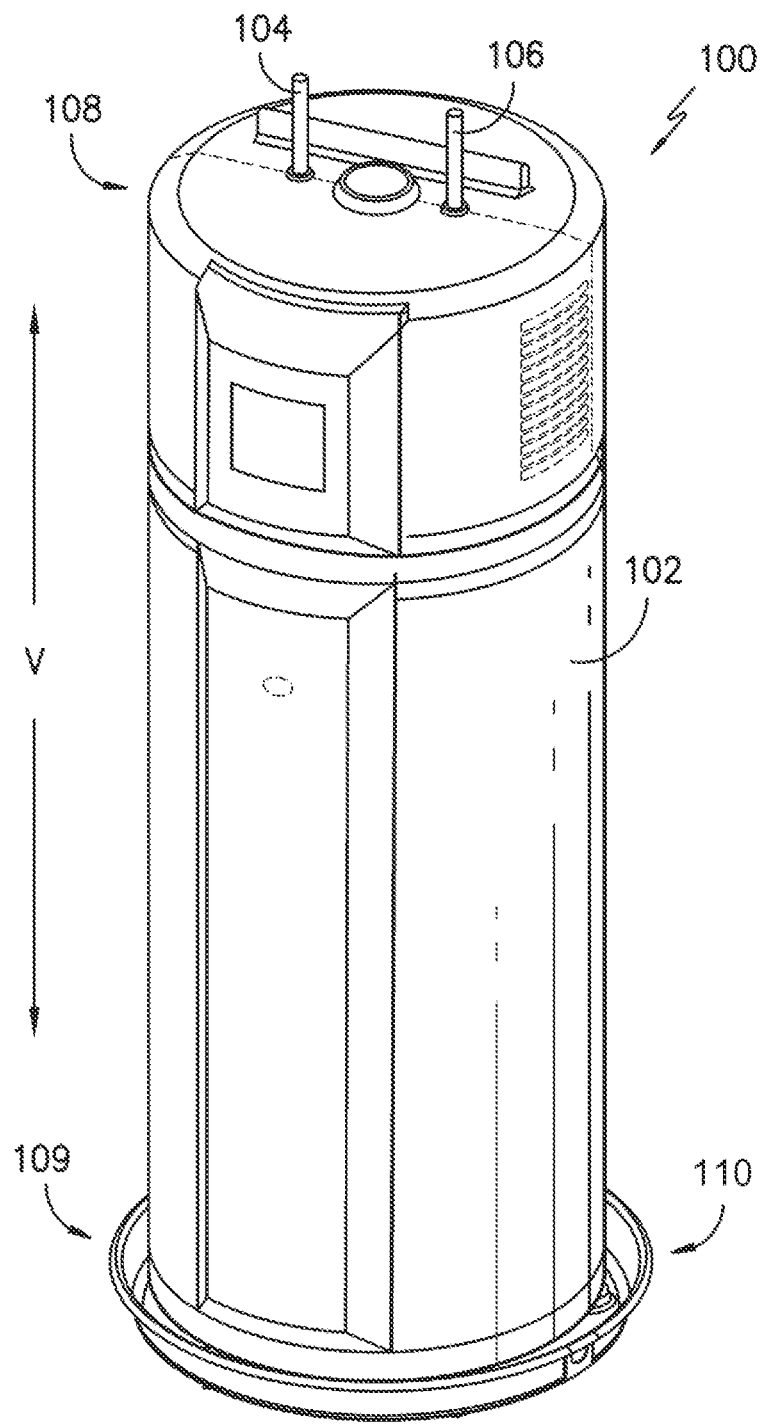
FIG. 1 provides a perspective view of a water heater appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
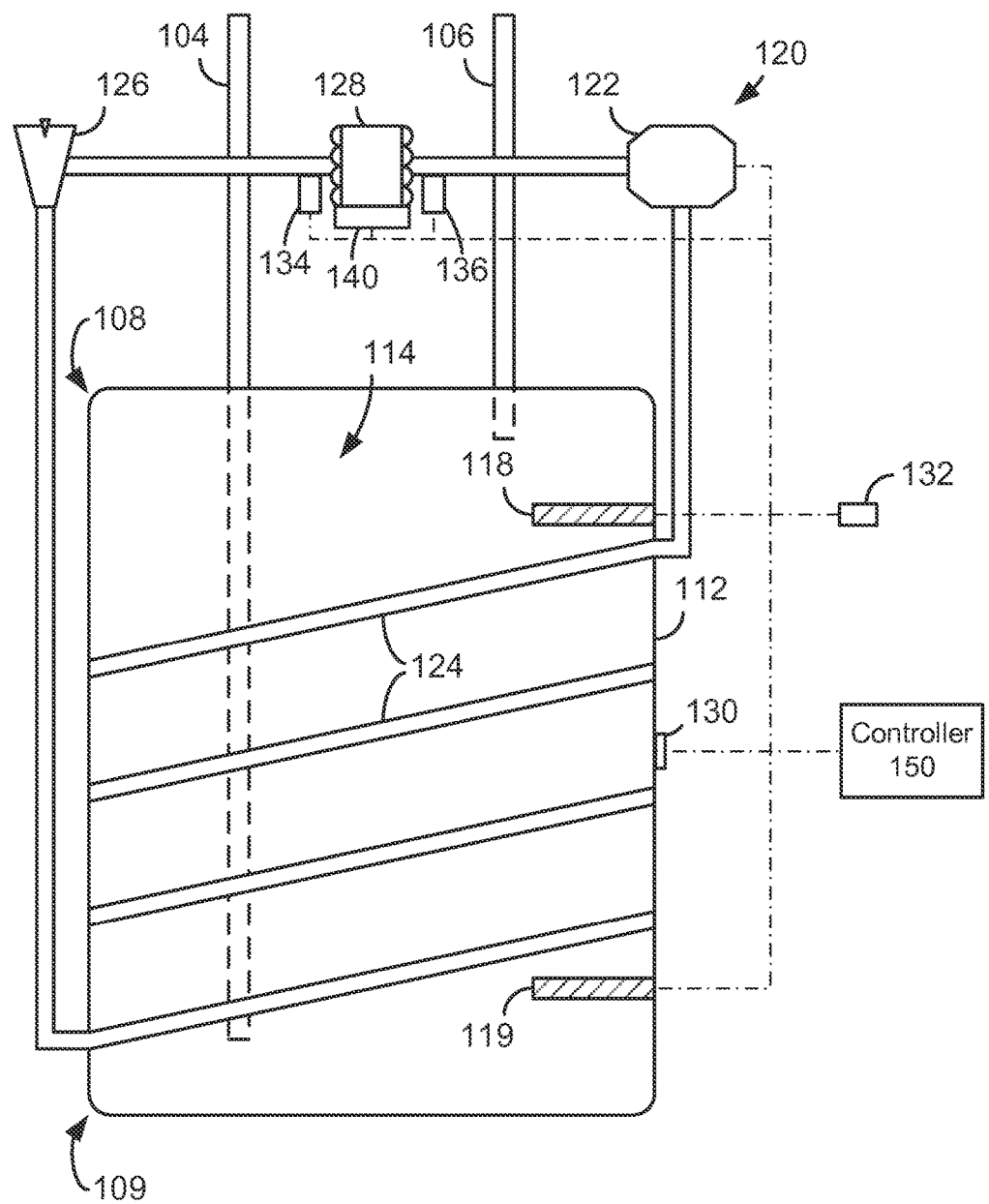
FIG. 2 provides a schematic view of certain components of the exemplary water heater appliance of FIG. 1.

FIG. 1 provides a perspective view of a water heater appliance 100 according to an exemplary embodiment of the present subject matter. FIG. 2 provides a schematic view of certain components of water heater appliance 100. As may be seen in FIGS. 1 and 2, water heater appliance 100 includes a casing 102 and a tank 112 mounted within casing 102. Tank 112 defines an interior volume 114 for heating water therein.

Water heater appliance 100 also includes a cold water conduit 104 and a hot water conduit 106 that are both in fluid communication with tank 112 within casing 102. As an example, cold water from a water source, e.g., a municipal water supply or a well, enters water heater appliance 100 through cold water conduit 104. From cold water conduit 104, such cold water enters interior volume 114 of tank 112 wherein the water is heated to generate heated water. Such heated water exits water heater appliance 100 at hot water conduit 106 and, e.g., is supplied to a bath, shower, sink, or any other suitable feature.

As may be seen in FIG. 1, water heater appliance 100 extends between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100.

A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 of water heater appliance 100. It should be understood that water heater appliance 100 is provided by way of example only and that the present subject matter may be used with any suitable water heater appliance.

Turning now to FIG. 2, water heater appliance 100 includes an upper heating element 118, a lower heating element 119 and a sealed system 120 for heating water within interior volume 114 of tank 112. Thus, water heater appliance 100 is commonly referred to as a "heat pump water heater appliance." Upper and lower heating elements 118 and 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner.

Sealed system 120 includes a compressor 122, a condenser 124, a throttling device 126 and an evaporator 128. Condenser 124 is thermally coupled or assembled in a heat exchange relationship with tank 112 in order to heat water within interior volume 114 of tank 112 during operation of sealed system 120. In particular, condenser 124 may be a conduit coiled around and mounted to tank 112. During operation of sealed system 120, refrigerant exits evaporator 128 as a fluid in the form of a superheated vapor and/or high quality vapor mixture. Upon exiting evaporator 128, the refrigerant enters compressor 122 wherein the pressure and temperature of the refrigerant are increased such that the refrigerant becomes a superheated vapor. The superheated vapor from compressor 122 enters condenser 124 wherein it transfers energy to the water within tank 112 and condenses into a saturated liquid and/or high quality liquid vapor mixture. This high quality/saturated liquid vapor mixture exits condenser 124 and travels through throttling device 126 that is configured for regulating a flow rate of refrigerant therethrough. Upon exiting throttling device 126, the pressure and temperature of the refrigerant drop at which time the refrigerant enters evaporator 128 and the cycle repeats itself. In certain exemplary embodiments, throttling device 126 may be an electronic expansion valve (EEV).

A fan or air handler 140 may assist with heat transfer between air about water heater appliance 100, e.g., within casing 102, and refrigerant within evaporator 128. Air handler 140 may be positioned within casing 102 on or adjacent evaporator 128. Thus, when activated, air handler 140 may direct a flow of air towards or across evaporator 128, and the flow of air from air handler 140 may assist with heating refrigerant within evaporator 128. Air handler 140 may be any suitable type of air handler, such as an axial or centrifugal fan.

Water heater appliance 100 also includes a tank temperature sensor 130. Tank temperature sensor 130 is configured for measuring a temperature of water within interior volume 114 of tank 112. Tank temperature sensor 130 can be positioned at any suitable location within or on water heater appliance 100. For example, tank temperature sensor 130 may be positioned within interior volume 114 of tank 112 or may be mounted to tank 112 outside of interior volume 114 of tank 112. When mounted to tank 112 outside of interior volume 114 of tank 112, tank temperature sensor 130 can be configured for indirectly measuring the temperature of water within interior volume 114 of tank 112. For example, tank temperature sensor 130 can measure the temperature of tank 112 and correlate the temperature of tank 112 to the temperature of water within interior volume 114 of tank 112. Tank temperature sensor 130 may also be positioned at or adjacent top portion 108 of water heater appliance 100, e.g., at or adjacent an inlet of hot water conduit 106.

Tank temperature sensor 130 can be any suitable temperature sensor. For example, tank temperature sensor 130 may be a thermocouple or a thermistor. As may be seen in FIG. 2, tank temperature sensor 130 may be the only temperature sensor positioned at or on tank 112 that is configured for measuring the temperature of water within interior volume 114 of tank 112 in certain exemplary embodiments. In alternative exemplary embodiments, additional temperature sensors may be positioned at or on tank 112 to assist tank temperature sensor 130 with measuring the temperature of water within interior volume 114 of tank 112, e.g., at other locations within interior volume 114 of tank 112.

Water heater appliance 100 also includes an ambient temperature sensor 132, an evaporator inlet temperature sensor 134 and an evaporator outlet temperature sensor 136. Ambient temperature sensor 132 is configured for measuring a temperature of air about water heater appliance 100. Ambient temperature sensor 132 can be positioned at any suitable location within or on water heater appliance 100. For example, ambient temperature sensor 132 may be mounted to casing 102, e.g., at or adjacent top portion 108 of water heater appliance 100. Ambient temperature sensor 132 can be any suitable temperature sensor. For example, ambient temperature sensor 132 may be a thermocouple or a thermistor.

Evaporator inlet temperature sensor 134 is configured for measuring a temperature of refrigerant at or adjacent inlet of evaporator 128. Thus, evaporator inlet temperature sensor 134 may be positioned at or adjacent inlet of evaporator 128, as shown in FIG. 2. For example, evaporator inlet temperature sensor 134 may be mounted to tubing that directs refrigerant into evaporator 128, e.g., at or adjacent inlet of evaporator 128. When mounted to tubing, evaporator inlet temperature sensor 134 can be configured for indirectly measuring the temperature of refrigerant at inlet of evaporator 128. For example, evaporator inlet temperature sensor 134 can measure the temperature of the tubing and correlate the temperature of the tubing to the temperature of refrigerant at inlet of evaporator 128. Evaporator inlet temperature sensor 134 can be any suitable temperature sensor. For example, evaporator inlet temperature sensor 134 may be a thermocouple or a thermistor.

Evaporator outlet temperature sensor 136 is configured for measuring a temperature of refrigerant at or adjacent outlet of evaporator 128. Thus, evaporator outlet temperature sensor 136 may be positioned at or adjacent outlet of evaporator 128, as shown in FIG. 2. For example, evaporator outlet temperature sensor 136 may be mounted to tubing that directs refrigerant out of evaporator 128, e.g., at or adjacent outlet of evaporator 128. When mounted to tubing, evaporator outlet temperature sensor 136 can be configured for indirectly measuring the temperature of refrigerant at outlet of evaporator 128. For example, evaporator outlet temperature sensor 136 can measure the temperature of the tubing and correlate the temperature of the tubing to the temperature of refrigerant at outlet of evaporator 128. Evaporator outlet temperature sensor 136 can be any suitable temperature sensor. For example, evaporator outlet temperature sensor 136 may be a thermocouple or a thermistor.

Water heater appliance 100 further includes a controller 150 that is configured for regulating operation of water heater appliance 100. Controller 150 is in, e.g., operative, communication with upper heating element 118, lower heating element 119, compressor 122, tank temperature sensor 130, ambient temperature sensor 132, evaporator inlet temperature sensor 134, evaporator outlet temperature sensor 136, and air handler 140. Thus, controller 150 may selectively activate upper and lower heating elements 118 and 119 and/or compressor 122 in order to heat water within interior volume 114 of tank 112, e.g., in response to signals from tank temperature sensor 130, ambient temperature sensor 132, evaporator inlet temperature sensor 134 and/or evaporator outlet temperature sensor 136.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 may operate upper heating element 118, lower heating element 119 and/or compressor 122 in order to heat water within interior volume 114 of tank 112. As an example, a user may select or establish a set temperature, $t_s$, for water within interior volume 114 of tank 112, or the set temperature $t_s$ for water within interior volume 114 of tank 112 may be a default value. Based upon the set temperature $t_s$ for water within interior volume 114 of tank 112, controller 150 may selectively activate upper heating element 118, lower heating element 119 and/or compressor 122 in order to heat water within interior volume 114 of tank 112 to the set temperature $t_s$ for water within interior volume 114 of tank 112. The set temperature $t_s$ for water within interior volume 114 of tank 112 may be any suitable temperature. For example, the set temperature $t_s$ for water within interior volume 114 of tank 112 may be between about one hundred degrees Fahrenheit and about one hundred and eighty-degrees Fahrenheit. As used herein with regards to temperature approximations, the term "about" means within ten degrees of the stated temperature.

Figure 3:
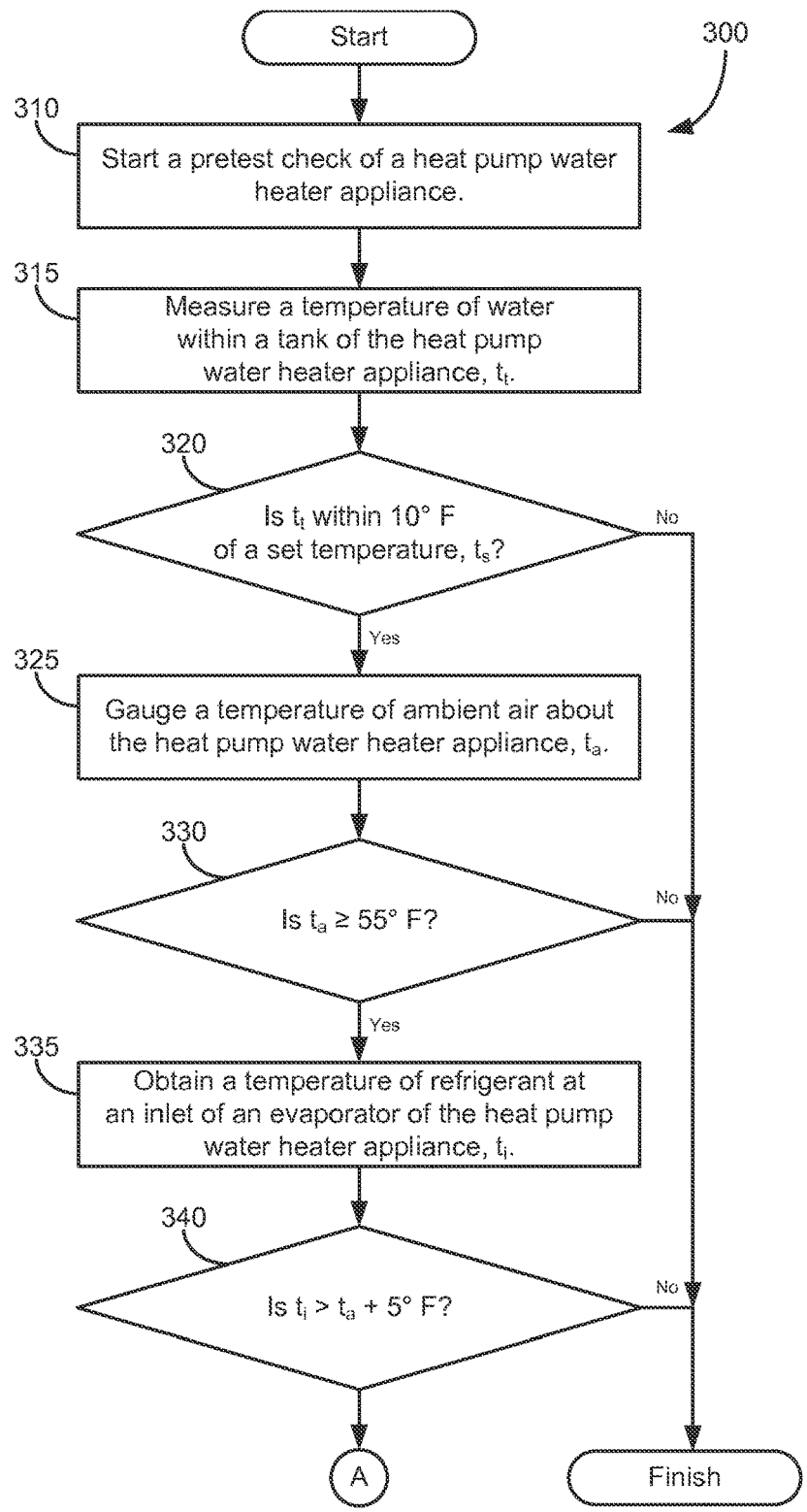
FIGS. 3, 4 and 5 illustrate a method for testing components of a heat pump appliance according to an exemplary embodiment of the present subject matter.
Figure 4:
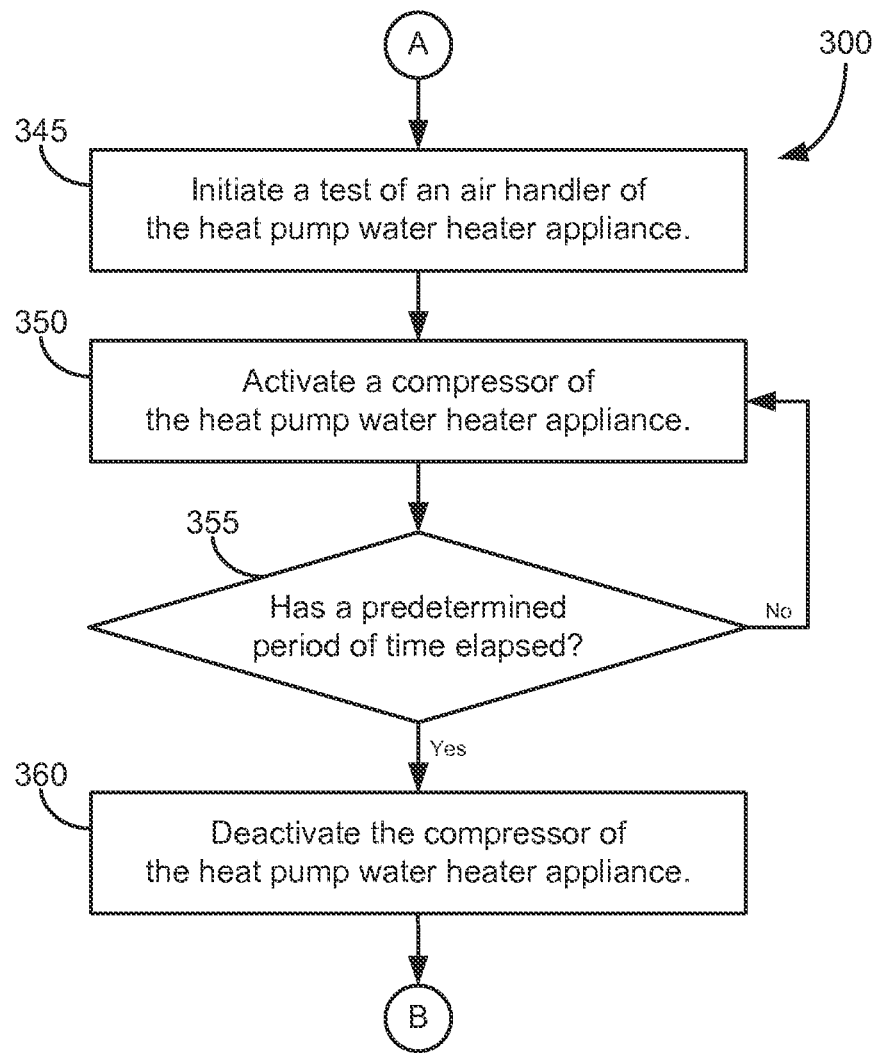
Figure 5:
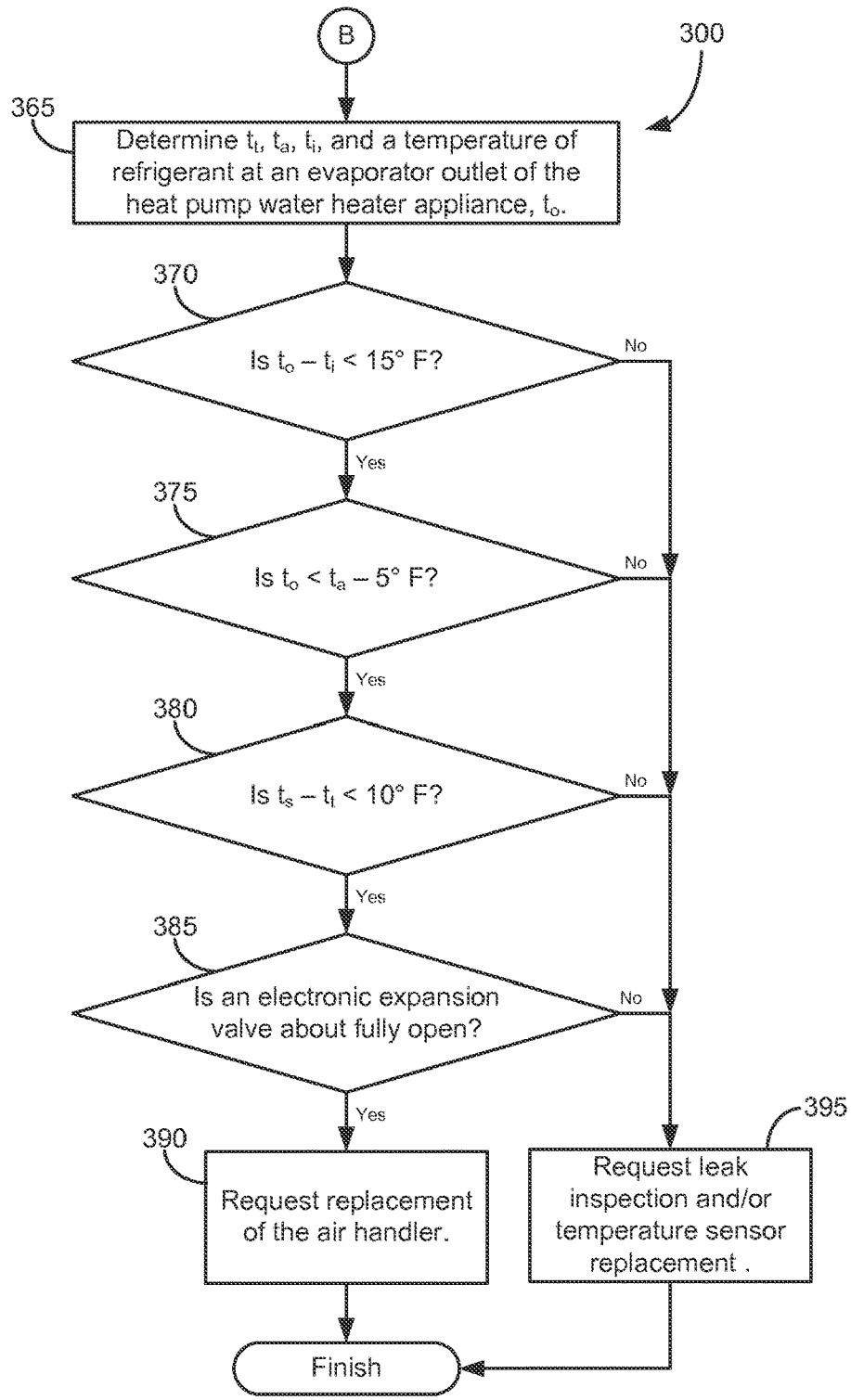

FIGS. 3, 4 and 5 illustrate a method 300 for testing components of a heat pump appliance according to an exemplary embodiment of the present subject matter. Method 300 can be used to test components of any suitable appliance having a heat pump. For example, method 300 may be used to test components of water heater appliance 100 (FIG. 1). Thus, while described below in the context of water heater appliance 100, it will be understood that method 300 may be used with or on any suitable heat pump appliances, such as a refrigerator appliance, an HVAC appliance, a heat pump dryer appliance, etc. As discussed in greater detail below, method 300 may assist with identifying or detecting when air handler 140 is malfunctioning or not operating suitably.

Method 300 may be implemented with any suitable computing device or combination of computing devices. As an example, controller 150 may be programmed or configured to implement method 300. Method 300 may also be performed by a computing device of a service technician. For example, the service technician may connect the computing device to controller 150 of water heater appliance 100 in order to permit the computing device to implement method 300. Thus, while described in greater detail below with reference to controller 150, it will be understood that all or some of the steps of method 300 may be performed by the computing device of a service technician, e.g., or assist controller 150 with implementing method 300.

Method 300 may be initiated in response to a fault code of water heater appliance 100, e.g., when controller 150 of water heater appliance 100 outputs the fault code. As an example, controller 150 of water heater appliance 100 may output a fault code when evaporator 128 is operating a cooler than normal temperature in a particular ambient temperature. As another example, controller 150 of water heater appliance 100 may output a fault code when evaporator 128 is operating a colder than normal temperature regardless of the ambient temperature. As another example, controller 150 of water heater appliance 100 may output a fault code when an expansion valve of water heater appliance 100 is operating a nearly closed position.

At step 310, a pretest check of water heater appliance 100 is started. The pretest check may assist with ensuring that conditions are suitable for implementing subsequent steps of method 300. At step 315, a tank water temperature, $t_t$, is measured. For example, controller 150 may receive a temperature measurement from tank temperature sensor 130 at step 315. At step 320, controller 150 determines whether the tank water temperature $t_t$ from step 315 is within about ten degrees Fahrenheit of the set temperature $t_s$ of water heater appliance 100. It should be understood that any suitable temperature difference may be used at step 320. Thus, in alternative exemplary embodiments, controller 150 may determine whether the tank water temperature $t_t$ from step 315 is within about five degrees Fahrenheit, about twenty degrees Fahrenheit, etc. of the set temperature $t_s$ of water heater appliance 100.

Step 320 may assist with ensuring that water within tank has been heated to about the set temperature $t_s$ before implementing subsequent steps of method 300. Thus, if the tank water temperature $t_t$ from step 315 is not within about ten degrees Fahrenheit of the set temperature $t_s$ at step 320, controller 150 may terminate method 300. Conversely, controller 150 may proceed to step 325 if the tank water temperature $t_t$ from step 315 is within about ten degrees Fahrenheit of the set temperature $t_s$ at step 320.

In alternative exemplary embodiments, method 300 may include establishing a temperature of fluid being treated by a heat pump appliance at step 320 rather than the tank water temperature $t_t$. As an example, when the heat pump appliance is a refrigerator appliance, method 300 may include establishing a temperature of air within a cabinet of the refrigerator appliance at step 320. As another example, when the heat pump appliance is an HVAC appliance, method 300 may include establishing a temperature of air within a building being treated by the HVAC appliance at step 320. As yet another example, when the heat pump appliance is a heat pump clothes dryer appliance, method 300 may include establishing a temperature of air within a drum of the heat pump clothes dryer appliance at step 320.

At step 325, an ambient air temperature, $t_a$, about water heater appliance 100 is measured or gauged. For example, controller 150 may receive a temperature measurement from ambient temperature sensor 132 at step 325. At step 330, controller 150 determines whether the ambient air temperature $t_a$ about water heater appliance 100 from step 325 is greater than or equal to about fifty-five degrees Fahrenheit. It should be understood that the ambient air temperature $t_a$ may be compared to any suitable temperature at step 330 in alternative exemplary embodiments. For example, controller 150 may determine whether the ambient air temperature $t_a$ from step 325 is greater than or equal to about forty degrees Fahrenheit, about fifty degrees Fahrenheit, about sixty degrees Fahrenheit, etc. at step 330.

Step 330 may assist with ensuring that the ambient air temperature $t_a$ is sufficient to perform subsequent steps of method 300. Thus, if the temperature of ambient air about water heater appliance 100 from step 325 is not greater than or equal to about fifty-five degrees Fahrenheit at step 330, controller 150 may terminate method 300. Conversely, controller 150 may proceed to step 335 if the ambient air temperature $t_a$ about water heater appliance 100 from step 325 is greater than or equal to about fifty-five degrees Fahrenheit at step 330.

At step 335, an evaporator inlet refrigerant temperature $t_i$ is obtained or measured. For example, controller 150 may receive a temperature measurement from evaporator inlet temperature sensor 134 at step 335. At step 340, controller 150 determines whether the evaporator inlet refrigerant temperature $t_i$ from step 335 is greater than a sum of the ambient air temperature $t_a$ from step 325 and about five degrees Fahrenheit. It should be understood that any suitable constant temperature may be added to the ambient air temperature $t_a$ at step 340. For example, about ten degrees Fahrenheit, about fifteen degrees Fahrenheit or about twenty degrees Fahrenheit may be added to the ambient air temperature $t_a$ at step 340.

If the evaporator inlet refrigerant temperature $t_i$ from step 335 is not greater than the sum of the ambient air temperature $t_a$ from step 325 and about five degrees Fahrenheit at step 340, controller 150 may terminate method 300. In addition, controller 150 may request replacement of evaporator inlet temperature sensor 134 if the evaporator inlet refrigerant temperature $t_i$ from step 335 is not greater than the sum of the ambient air temperature $t_a$ from step 325 and about five degrees Fahrenheit at step 340. Step 340 may assist with identifying faulty or defective evaporator inlet temperature sensors 134. Controller 150 may proceed to step 345 if the evaporator inlet refrigerant temperature $t_i$ from step 335 is greater than the sum of the ambient air temperature $t_a$ from step 325 and about five degrees Fahrenheit at step 340.

At step 345, a test of air handler 140 of water heater appliance 100 is initiated. In particular, if the conditions of steps 320, 330, and 340 are satisfied, the pretest check of water heater appliance 100 is completed and controller 150 initiates the test of air handler 140 water heater appliance 100 at step 345. At step 350, controller 150 activates compressor 122 of water heater appliance 100. As an example, controller 150 may increase the set temperature $t_s$ of water heater appliance 100 at step 345 in order to activate compressor 122.

At step 355, controller 150 determines whether compressor 122 has been activated for a predetermined period of time. Thus, compressor 122 continues to operate at step 355 until the predetermined period of time has elapsed. The predetermined period of time may be any suitable period of time. For example, the predetermined period of time maybe about ten minutes, fifteen minutes, twenty minutes, etc. At step 360, the compressor 122 of water heater appliance 100 is deactivated. Thus, after the predetermined period of time has elapsed, controller 150 may deactivate the compressor 122 of water heater appliance 100 at step 360. In particular, controller 150 may decrease the set temperature $t_s$ of water heater appliance 100 at step 360 in order to deactivate compressor 122.

At step 365, the tank water temperature $t_t$, the ambient air temperature $t_a$ about water heater appliance 100, the evaporator inlet refrigerant temperature $t_i$, and an evaporator outlet refrigerant temperature, $t_o$, are determined or fixed. For example, controller 150 may receive temperature measurements from tank temperature sensor 130, ambient temperature sensor 132, evaporator inlet temperature sensor 134, and evaporator outlet temperature sensor 136 at step 365 in order to determine the tank water temperature $t_t$, the ambient air temperature $t_a$ about water heater appliance 100, the evaporator inlet refrigerant temperature $t_i$, and the evaporator outlet refrigerant temperature $t_o$. Step 365 may be performed at, immediately before, or immediately after step 360. Thus, when controller 150 deactivates compressor 122, controller 150 may determine or record the tank water temperature $t_t$, the ambient air temperature $t_a$ about water heater appliance 100, the evaporator inlet refrigerant temperature $t_i$, and the evaporator outlet refrigerant temperature $t_o$.

At step 370, controller 150 determines whether a difference between the evaporator outlet refrigerant temperature $t_o$ from step 365 and the evaporator inlet refrigerant temperature $t_i$ from step 365 is less than about fifteen degrees Fahrenheit. It should be understood that controller 150 may compare the difference between the evaporator outlet refrigerant temperature $t_o$ and the evaporator inlet refrigerant temperature $t_i$ to any suitable temperature at step 370. For example, controller 150 may determine whether the difference between the evaporator outlet refrigerant temperature $t_o$ from step 365 and the evaporator inlet refrigerant temperature $t_i$ from step 365 is less than about ten degrees Fahrenheit, about twenty degrees Fahrenheit, etc. at step 370.

At step 375, controller 150 determines whether the evaporator outlet refrigerant temperature $t_o$ from step 365 is less than a difference between the ambient air temperature $t_a$ about water heater appliance 100 from step 365 and about five degrees Fahrenheit. It should be understood that the evaporator outlet refrigerant temperature $t_o$ may be compared to any suitable difference at step 375. For example, the difference between the ambient air temperature $t_a$ from step 365 and about ten degrees Fahrenheit, about twenty degrees Fahrenheit, etc. may be taken at step 375.

At step 380, controller 150 determines whether the difference between the set temperature $t_s$ and the tank water temperature $t_t$ from step 365 is less than about ten degrees Fahrenheit. It should be understood that the difference between the set temperature $t_s$ and the tank water temperature $t_t$ may be compared to any suitable temperature at step 380. For example, controller 150 may determine whether the difference between the set temperature $t_s$ and the tank water temperature $t_t$ from step 365 is less than about five degrees Fahrenheit, about twenty degrees Fahrenheit, etc. at step 380. In alternative exemplary embodiments, method 300 may include establishing whether a difference between a set temperature (e.g., a target temperature) of a heat pump appliance and a temperature of fluid being treated by the heat pump appliance is less than about ten degrees Fahrenheit, at step 380.

At step 385, controller 150 determines a position of throttling device 126, e.g., when throttling device 126 is an electronic expansion valve. In particular, controller 150 may receive a signal from throttling device 126 indicating whether throttling device 126 is fully open at step 385. In certain exemplary embodiments, throttling device 126 may be adjustable between a series of discrete positions, such as a series of positions "0-400" where each number of the series corresponds to a particular position of throttling device 126. Throttling device 126 may be about fully open when the position of throttling device 126 is greater than a "350" position At step 390, replacement of air handler 140 of water heater appliance 100 is requested if steps 370, 375, 380, and 385 are true. Thus, controller 150 may determine that air handler 140 of water heater appliance 100 is faulty or not operating suitably (e.g., not operating or operating too slowly) if steps 370, 375, 380, and 385 are true. As an example, controller 150 may present a message on a display requesting replacement of air handler 140 at step 390. Conversely, inspection of sealed system 120 for leaks and/or replacement of at least one of ambient temperature sensor 132, tank temperature sensor 130, evaporator inlet temperature sensor 134, and evaporator outlet temperature sensor 136 may be requested at step 395 if at least one of steps 370, 375, 380, and 385 are not true. Thus, controller 150 may determine that air handler 140 of water heater appliance 100 is operating properly and/or that other components of water heater appliance 100 are not operating properly if at least one of steps 370, 375, 380, and 385 is not true. As an example, controller 150 may present a message on a display requesting inspection of sealed system 120 for leaks and/or replacement of at least one of ambient temperature sensor 132, tank temperature sensor 130, evaporator inlet temperature sensor 134, and evaporator outlet temperature sensor 136 at step 395. It should be understood that method 700 may be performed without opening casing 102 of water heater appliance 100 and/or accessing or visually inspecting components of water heater appliance 100 within casing 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method for detecting a faulty air handler of a heat pump appliance, comprising:
   initiating a test of an air handler of the heat pump appliance;

activating a compressor of the heat pump appliance during the test of the air handler of the heat pump appliance;

deactivating the compressor of the heat pump appliance at a predetermined period of time after said step of activating;

at said step of deactivating, determining: (1) a temperature of refrigerant at an evaporator inlet of the heat pump appliance with an evaporator inlet temperature sensor; (2) a temperature of refrigerant at an evaporator outlet of the heat pump appliance with an evaporator outlet temperature sensor; and (3) a temperature of fluid being treated by the heat pump appliance with a third temperature sensor adjacent to a condenser; and requesting replacement of the air handler of the heat pump appliance when: (1) a difference between the temperature of refrigerant at the evaporator outlet and the temperature of refrigerant at the evaporator inlet is less than a first temperature value; and (2) a difference between the temperature of refrigerant at the evaporator inlet and the temperature of fluid being treated by the heat pump appliance is less than a second temperature value.

2. The method of claim 1, further comprising:

performing a pre-check of the heat pump appliance prior to said step of initiating;

measuring the temperature of fluid being treated by the heat pump appliance during the pre-check of the heat pump appliance; and gauging a temperature of ambient air about the heat pump appliance during the pre-check of the heat pump appliance;

wherein said step of initiating comprises initiating the test of an air handler of the heat pump appliance when the temperature of fluid being treated by the heat pump appliance from said step of measuring is within about ten degrees Fahrenheit of a set temperature of the heat pump appliance and when the temperature of ambient air about the heat pump appliance from said step of gauging is greater than about fifty-five degrees Fahrenheit.

3. The method of claim 2, further comprising replacing an evaporator inlet temperature sensor of the heat pump appliance prior to said step of initiating when the temperature of refrigerant at the evaporator inlet is greater than a sum of the temperature of ambient air about the heat pump appliance and about five degrees Fahrenheit.

4. The method of claim 1, further comprising requesting a refrigerant leak search, an evaporator inlet temperature sensor inspection, and an evaporator outlet temperature sensor inspection when: (1) the difference between the temperature of refrigerant at the evaporator outlet and the temperature of refrigerant at the evaporator inlet is not less than about fifteen degrees Fahrenheit; or (2) the difference between a set temperature of the heat pump appliance and the temperature of fluid being treated by the heat pump appliance is not less than about ten degrees Fahrenheit.

5. The method of claim 1, wherein said step of activating comprises increasing a set temperature of the heat pump appliance.

6. The method of claim 1, wherein said step of requesting comprises presenting a message on a display of the heat pump appliance or on a computing device of a service technician.

7. The method of claim 1, wherein said steps of initiating, activating, deactivating, determining, and requesting are performed by a controller of the heat pump appliance or a computing device of a service technician.

8. The method of claim 1, wherein the predetermined period of time is about fifteen minutes.

9. The method of claim 1, wherein the first temperature value is about fifteen degrees Fahrenheit and the second temperature value is about ten degrees Fahrenheit.

\* \* \* \* \*